United States Patent
Schiestl

(10) Patent No.: US 10,942,692 B2
(45) Date of Patent: Mar. 9, 2021

(54) APPARATUS AND METHOD FOR PRODUCING A DIGITAL PRINTED IMAGE

(71) Applicant: Angelo Schiestl, Langkampfen (AT)

(72) Inventor: Angelo Schiestl, Langkampfen (AT)

( * ) Notice: Subject to any disclaimer, the term of this patent is extended or adjusted under 35 U.S.C. 154(b) by 0 days.

(21) Appl. No.: 16/630,802

(22) PCT Filed: Jun. 22, 2018

(86) PCT No.: PCT/EP2018/066737
§ 371 (c)(1),
(2) Date: Jan. 13, 2020

(87) PCT Pub. No.: WO2019/020293
PCT Pub. Date: Jan. 31, 2019

(65) Prior Publication Data
US 2020/0167107 A1   May 28, 2020

(30) Foreign Application Priority Data
Jul. 28, 2017  (EP) ...................................... 17183794

(51) Int. Cl.
*G06F 3/12* (2006.01)
*G06K 15/02* (2006.01)

(52) U.S. Cl.
CPC .......... *G06F 3/1247* (2013.01); *G06F 3/1204* (2013.01); *G06F 3/1206* (2013.01);
(Continued)

(58) Field of Classification Search
CPC .... G06F 3/1247; G06F 3/1204; G06F 3/1206; G06F 3/1285; G06F 3/1208;
(Continued)

(56) References Cited

U.S. PATENT DOCUMENTS

| 10,171,704 B1 * | 1/2019 | Li .................. G06K 15/1813 |
| 2004/0141192 A1 | 7/2004 | Jodra et al. |
| 2008/0218776 A1 | 9/2008 | Takami et al. |

FOREIGN PATENT DOCUMENTS

| DE | 199 22 940 A1 | 11/2000 |
| DE | 10 2005 014 152 A1 | 10/2006 |
| EP | 0 878 956 A1 | 11/1998 |

OTHER PUBLICATIONS

International Search Report issued in PCT/EP2018/066737; dated Oct. 9, 2018.
(Continued)

*Primary Examiner* — Tammy Paige Goddard
*Assistant Examiner* — Darryl V Dottin
(74) *Attorney, Agent, or Firm* — Studebaker & Brackett PC

(57) ABSTRACT

The present invention relates to a printing system for producing a digital printed image, in particular on a textile, having a data server which is designed to receive image data of a print order, at least one printing apparatus with at least one digital print head, in particular an inkjet print head, which is designed to receive and print at least one print file for a print order, a first raster image processor module which is provided on the data server and designed to make available the received image data of the print order as a converted file format that can be read and processed in the form of a printed image by the printing apparatus, wherein the image data in the converted file format can be transmitted to the printer. The at least one printing apparatus is designed with a second raster image processor module, by means of which the image data in the converted file format can be adapted in a printer-specific manner prior to the printing of a corresponding printed image. The present invention further relates to a method for producing a digital printed image, in particular on a textile, in which image data for a print order are sent to a data server, by means of a first raster image processor module the sent image data are converted into a data format which can be read and processed in the form of a printed image by at least one printing device having at least one digital print head, in particular an inkjet print head, and in which the image data in the converted file format are transmitted to the printing apparatus. The converted image data transmitted to the printing apparatus are adapted in a printer-specific manner on the printing apparatus by means of a second raster image processor module prior to the printing of a corresponding printed image.

14 Claims, 1 Drawing Sheet

(52) U.S. Cl.
CPC ....... *G06F 3/1285* (2013.01); *G06K 15/1836* (2013.01); *G06K 15/1848* (2013.01)

(58) Field of Classification Search
CPC .............. G06F 3/1256; G06K 15/1836; G06K 15/1848; H04N 1/54; H04N 1/00204; H04N 1/6011
USPC ....................................................... 358/1.15
See application file for complete search history.

(56) References Cited

OTHER PUBLICATIONS

International Preliminary Report on Patentability issued in PCT/EP2018/066737; completed on Jul. 11, 2019.

* cited by examiner

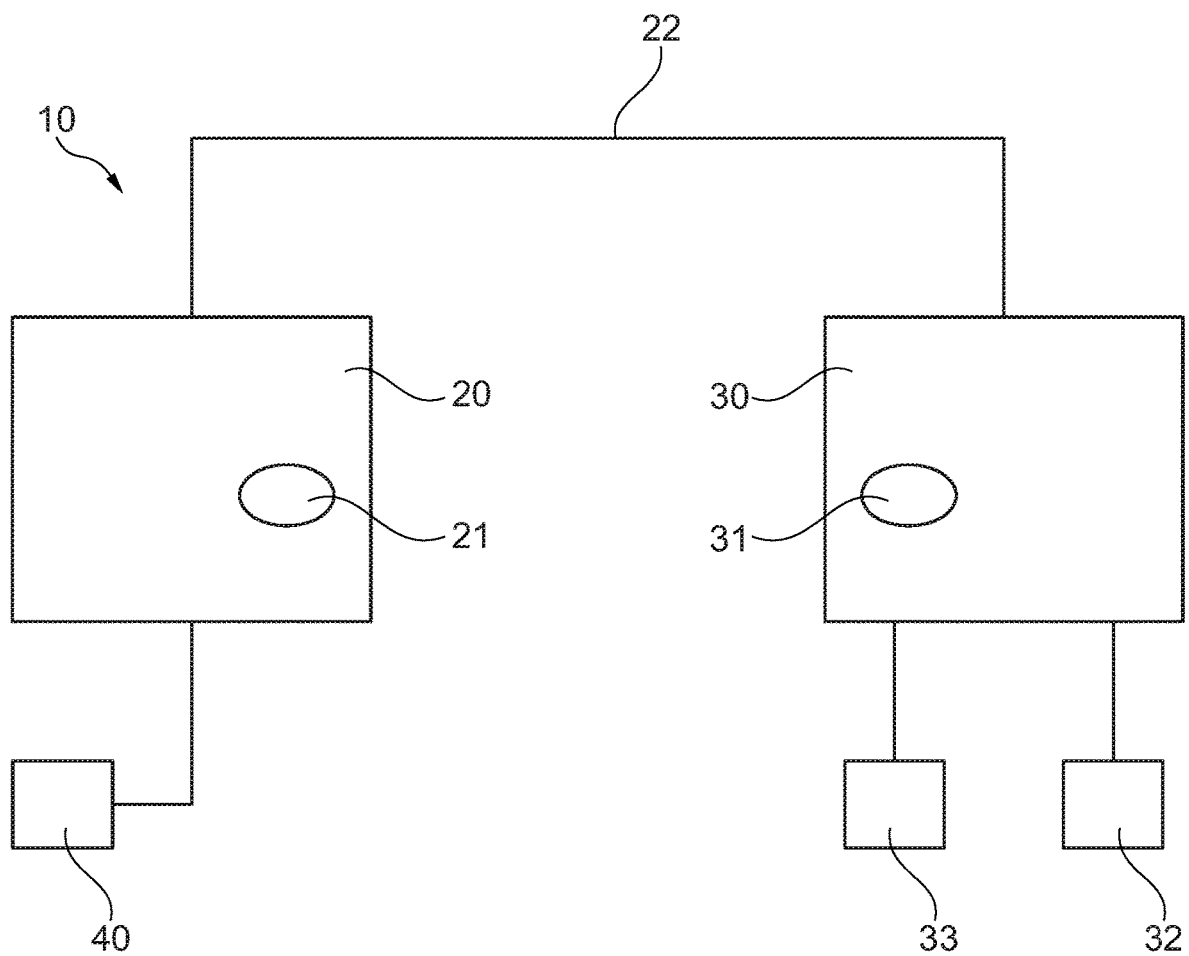

APPARATUS AND METHOD FOR PRODUCING A DIGITAL PRINTED IMAGE

The invention relates to a printing system for producing a digital printed image, in particular on a textile, in accordance with the preamble of claim 1 and to a method for producing a digital printed image, in particular on a textile, in accordance with the preamble of claim 8.

An apparatus of such type has a data server which is designed to receive image data of a print order, at least one printing apparatus with at least one digital print head, in particular an inkjet print head, which is designed to receive and print at least one print file for a print order, and a first raster image processor module which is provided on the data server and designed to make available the received image data of the print order as a converted file format that can be read and processed in the form of a printed image by the printing apparatus, wherein the image data in the converted file format on the data server can be transmitted to the printing apparatus.

US 2004/14192 A1 discloses a printing system with a first and a second RIP-module, wherein the first RIP-module generates printer-readable signals and the second module generates an apparatus-independent version of these signals.

US 2008/2187761 A1 discloses an apparatus for the post-editing of image files before printing which is designed with a display device of the adapted printed image file.

In such a method image data for a print order are sent to a data server, the sent image data are converted by means of a first raster image processor module into a file format which can be read and processed in the form of a printed image by at least one printing device having at least one digital print head, in particular an inkjet print head, and the image data in the converted file format are transmitted to the printing device.

In digital printing technology, digitally stored print orders e.g. for a printed image to be produced on a textile are generated regularly. These image data can originate from a variety of sources and therefore do not have a uniform format, on the basis of which a digital printer would be capable of representing the image data in the form of pixels on a printing surface.

Therefore, a so-called raster image processor module or a raster image processor (RIP processor) is usually provided which converts the image files, in particular an image file, produced by a user into a printer-readable form.

Besides the printing machine itself the conversion processes in the raster image processor module are the most important and at the same time the most error-prone component in the printing process. The conversion of the image data in the raster image processor module must be carried out in a printer-specific manner since the writing characteristic of the printer to be used must be taken into account when producing the printer bitmap. The rendering in the raster image processor module therefore contains the attributes of the printer itself together with the image data to be printed. This printer specificity in the RIP-output may lead to problems if the RIP-output is passed on to a printer of a different design, in particular a different electrographic design. One of the problems arising therefrom can e.g. be that the image to be printed will be either darker or brighter than what would be printed on the printer, for which the original RIP was carried out.

However, such deviations are normally only visible after the printing of the printed image which may lead to increased printing costs, especially when using different printers.

The present invention therefore sets itself the object to provide a printing system and a method for producing a digital printed image, with which an economical operation of the printing system is rendered possible even in the case of a changing use of different printers, in particular electrographically different printers.

In accordance with the invention the object is achieved by a printing system according to claim 1 and by a method according to claim 8.

Preferred embodiments of the present invention are stated in the dependent claims.

The printing system according to the invention is characterized in that the at least one printing apparatus has a second raster image processor module, by means of which the image data in the converted file format can be adapted in a printer-specific manner prior to the printing of a corresponding printed image.

A first fundamental idea of the present invention resides in the fact that in addition to a first raster image processor module, which is in particular provided on a data server, provision is made, in particular location-independent of each other, for a second raster image processor module that is in each case directly located on at least one printing apparatus and is in particular adapted to the characteristics of the printer, on which the second raster image processor module is provided. In particular, this makes it possible that on transmission of incorrectly or insufficiently converted image data to the printing apparatus a correction of the transmitted, converted image data can be made directly on the printing apparatus. For instance, this can be carried out automatically by the second raster image processor module and/or the image data can be subjected to further adaptations by a user on the printing machine.

The raster image processor module can be a special software, hardware or a combination of hardware and software that converts specific data of a higher page description language, e.g. postscript, PDF or PCL, into a raster graphic in order to normally output this on a printer afterwards.

Basically, the data server according to the invention can be any device, from which a print order or a print command can be transmitted to a digital printer, in which case the device has the first raster image processor module. In particular, this can be a server that manages print orders for a plurality of printing devices, computers or also mobile apparatuses, in which case each of the devices that constitutes a data server according to the invention has at least one processor for receiving and processing a print order and is preferably designed with a storage module that allows at least the intermediate storage of the print order.

The reception of a print order in accordance with the present invention comprises, on the one hand, the fact that the data server receives a print order from an independent source, for example via a network, the internet or an external storage medium, and stores this in a processable manner. However, the reception of a print order also comprises those print orders that have been produced directly on the data server, in which case the reception is constituted by the input of the print order made by a user on the data server.

A print order can be any file or several files or data or respectively information which, in particular after conversion in the first raster image processor module, make it possible as print data or print file(s) readable by a digital printer that the printer is able to provide any chosen surface with a digital printed image. According to the present invention a raster image processor module is any software and/or hardware that is designed to convert or render image data of a print order into a file format that can be read and transformed into a printed image by a digital printer.

Transmission of the converted image data from the data server to the printing device can take place both in a direct way, for instance via a network or a direct, e.g. a serial data-electronic connection of the printing device to the data server. Additionally or alternatively, a transmission of the converted image data can also take place in an indirect way, for instance via a device, more particularly a module, a software or another server, which is preferably designed to assign converted image data to individual printing devices.

In accordance with the invention the second raster image processor module provided pursuant to the invention is designed to optimize or adapt, independently and/or based on the input of a user, image data for an output on the respective printer in the form of a printed image.

According to a further development of the present invention provision is made in that the printing device has reproduction means which are designed to display graphically and/or numerically the transmitted image data in the converted file format as a preliminary printed image to be expected. The reproduction means can for example have a display screen but are not limited thereto. On the display screen the printed image to be expected can be displayed graphically and/or data concerning image parameters, such as contrast, brightness, image sharpness, rasterization, resolution, dimensioning, trapping and/or color separation, can be reproduced. It is especially preferred that the reproduction means is connected to a graphics processor that reproduces the printed image to be printed with particularly high color fidelity on the reproduction means, thereby enabling the user to make corresponding adaptations for the optimized reproduction of the printed image on the surface to be printed. Hence, according to the invention the graphic display of the printed image to be expected can constitute an electronic graphic reproduction of the printing result to be expected on the printed surface displayed with high color fidelity on the reproduction means.

According to a particularly preferred further development of the present invention provision is made in that the printing device has input means for a user and processing means, by means of which at least one command can be entered and transmitted to the second raster image processor module for the printer-specific adaptation of the transmitted image data. Basically, the second raster image processor module can be designed to carry out independently printer-specific adaptations of the transmitted image data. However, since the editing made by the second raster image processor module can be a post-processing post-editing of the converted image data, according to the further development pursuant to the invention provision can be made in that the user is given the possibility, in particular based on the appearance perceived by the user and/or data concerning the printed image to be expected, to carry out adaptations of the previously described image characteristics (contrast, sharpness, . . . ) by means of the reproduction means. For this e.g. a keyboard, a mouse or another useful input means for the correction and/or alteration of the characteristics of the transmitted image data can be provided. By way of the second raster image processor module the adaptations of the transmitted image data made by the user can, for example, be implemented in the transmitted image data and processed in a manner readable by the printing device.

According to a further development of the present invention it is particularly expedient that prior to the execution of the at least one command for the printer-specific adaptation of the transmitted image data the reproduction means are designed to display the printed image to be expected after the adaptation. In particular, to enable the user to carry out a quality-oriented adaptation of the transmitted image data to the printing device, it may be advantageous that the alterations made by the user can also be displayed preferably directly on the reproduction means in a graphical and/or numerical manner. This can enable the user to carry out an especially precise adaptation of the transmitted image data to the printing device. In this connection a simultaneous before-after-display can be particularly advantageous, in which the received, transmitted image data as well as the adapted transmitted image data can be displayed next to each other, by preference graphically, whereby an improvement of the printed image is immediately visible.

According to a particularly expedient further development of the present invention provision is made in that based on the at least one transmitted command the second raster image processor module is designed to adapt a contrast, brightness, an image sharpness, a rasterization, a resolution, a dimensioning of the printed image to be printed, a trapping, a color separation and/or an open-prepress-interface image setting of the transmitted image data. Basically, the second raster image processor module can be designed to adapt in the transmitted image data any parameter relevant for a printed image to be printed.

According to the invention the dimensioning of the printed image to be printed can in particular constitute the length and width of the printing area on the surface to be printed, especially the textile.

According to the invention trapping comprises both the overfilling and the setting of the printer to a color acceptance of a subsequent printing color, especially in the case of wet-on-wet printing.

Overfilling refers to a technique or a method in the reproduction process for all printing methods that is necessary for a high-quality printed product. If in a printing method several colors are printed individually and successively on top of each other the substrate is always optimally aligned in the printing installation. At the most, white borders or holes, so-called white gaps, may arise on the borderline of two printing colors. To counteract an alignment of the surface to be printed that in practice often fails to be optimal, use is made of overfilling, in which an object is overprinted around with a brighter color e.g. with a thin line so that the boundary surfaces overlap minimally. As a result, minor misalignments can be compensated as long as the displacement is not larger than the overlapping area.

Color separation refers to the realization of individual printing colors, mostly in the prepress stage. Color separation is necessary because in many cases color information is not available in the form required for printing. For instance each of the colors of any pixel can be mixed from the primary colors red, green, blue (RGB) or cyan, magenta, yellow and black (CMYK). For this, the pixel proportion of every color used is calculated and the printed image is stored as a separate partial image that solely consists of pixels of one color with a different proportion of the color in the respective pixel. By superimposing the three (RGB) or four (CMYK) partial images the finished printed image is produced.

In open-prepress-interface image setting two copies of the printed image to be produced are generated. One copy features the high resolution of the printed image while the other copy can feature a lower resolution. Especially for the display of so-called "thumb nails", i.e. a miniature view of the image to be printed, or for the rapid transmission of preliminary printed image information the low-resolution printed image file can be made available faster than the high-resolution printed image file.

According to a preferred further development of the invention provision is made in that the printing apparatus is designed to print the image data adapted by the second raster image processor module. If the image data transmitted by the data server match the printing device, direct printing can take place without further editing by the second raster image processor module. Should a post-editing of the transmitted image data be necessary to adapt the converted image data to the printing device, the printed image can be printed onto the surface to be printed on completion of adaptation by the second raster image processor module. By preference, the printed image consists of individual discrete ink droplets from the at least one print head which jointly constitute the printed image on the surface.

According to a particularly expedient further development of the invention provision is made in that prior to the adaptation of the transmitted image data the second raster image processor module is designed to convert these into an adaptable file format. Basically, the second raster image processor module is designed to adapt the transmitted, converted image data to the printing device in a direct and independent manner or based on a user-entered command. If individual adaptations of the already converted form of the image data are not possible, the second raster image processor module is designed to convert the image data into an adaptable file format and adapt these to the framework conditions of the printing device and afterwards (re)convert these into a file format readable by the printing device.

The method according to the invention for producing a digital printed image is characterized in that by means of a second raster image processor module the converted image data transmitted to the printing device are adapted in a printer-specific manner on the printing device prior to the printing of a corresponding printed image.

According to a second fundamental idea of the present invention image data sent to a printing device are checked as to their compatibility with the said printing device by a user and/or a raster image processor module. In the case of a deviation, in particular from the electrographic characteristics of the printer, a corresponding adaptation of the image data is carried out, whereby an alteration, in particular an optimization of the display of the image on the printed surface, especially with regard to a contrast, a brightness, an image sharpness, a rasterization in the transmitted image file, a resolution, a dimensioning of the printed image to be printed, a trapping, a color separation and/or an open-prepress-interface image setting can be carried out.

According to a particularly preferred further development of the invention provision is made in that on the printing device reproduction means are provided, by means of which the transmitted image data in the converted file format are displayed graphically and/or numerically as a preliminary printed image to be expected. In particular, the reproduction means can have a display screen with high color fidelity, on which the printed image to be printed is displayed. Due to the fact that the display of a printed image on a display screen can in principle vary from the actual printed image, only a printed image to be expected rather than the printed image itself can be displayed by way of the reproduction means. Basically, the reproduction means can be designed to enable a user to make decisions with regard to a subsequent adaptation of the transmitted, converted image data, in particular an optimization of the printed image.

According to a further development of the invention it is especially preferred that at least one command to the second raster image processor module for the printer-specific adaptation of the transmitted image data is entered via input means for a user and transmitted via processing means. By way of the input means an input of a user can take place, whereby the transmitted image data can be adapted, in particular for an optimized printed image. The processing means can in particular have a processor that is designed to translate the user input into an instruction for adaptation of the transmitted image data that can be read by the second raster image processor module.

According to a further development of the invention it is particularly expedient that prior to the execution of the at least one command for the printer-specific adaptation of the transmitted image data the printed image to be expected after the adaptation is displayed by means of the reproduction means. Especially in the case of an adaptation made by the user it may be expedient that the implemented alterations can be displayed preferably in real time on the reproduction means. By particular preference, a before-after display, especially in real time, can take place that indicates to the user the effect of his or her optimization on the printed image to be produced. The reproduction means can also display, preferably in real time, the alterations made by the user in the form of numerical information.

According to a particularly preferred further development of the invention provision is made in that based on the transmitted commands a contrast, a brightness, an image sharpness, a rasterization, a resolution, a dimensioning of the printed image to be printed, a trapping, a color separation and/or an open-prepress-interface image setting of the transmitted image data is adapted by the second raster image processor module. Basically, for the purpose of an optimized display of the printed image on the surface to be printed the second raster image processor module can carry out an adaptation of the transmitted image data independently, in particular automatically. For this, the module identifies, on the basis of previously determined rules, an alteration of the converted printed image with respect to the characteristics of the printer and can also adapt these subsequently to the printing device. Additionally or alternatively, provision can be made for a user to actively intervene in the optimization of the transmitted image data. In this, it can be especially advantageous to adapt, in particular, the above-mentioned characteristics of the transmitted image data of the printed image to be printed. Basically, the second raster image processor module can be designed to carry out any adaptation of the transmitted print data that is required for an optimization of the printed image.

According to a further development of the invention it is especially preferred that the adapted image data are transformed by the at least one print head of the printing apparatus into a printed image. Especially after an adaptation of the image data by the second raster image processor module through an independent or user-controlled input the printing apparatus can use the transmitted, adapted image data to produce a printed image on a surface. Generally, the printing apparatus is designed to also print image data that were transmitted to the printing apparatus but did not undergo a further adaptation by the second raster image processor module. In principle, printing apparatus and printing device can be synonymous.

In accordance with a further development of the present invention provision is made in that prior to the adaptation of the transmitted image data these are converted on the printing apparatus, preferably by the second raster image processor module, into an adaptable file format. The image data converted by the first raster image processor module can be adapted directly by the second raster image processor module. Alternatively or additionally, before adaptation the image data transmitted to the printing device can initially be converted into another file format that is especially suitable for editing by the second raster image processor module. The conversion can be carried out by the raster image processor module or by another device, more particularly by another processor-controlled software.

The conversion into an adaptable file format can take place both before, during or after an adaptation by the second raster image processor module depending on which optimizations or adaptations of the transmitted image data seem necessary for an optimized display of the printed image on the surface to be printed.

In the drawing the invention is explained further hereinafter. In the drawing shows:

FIG. 1 a schematic illustration of the printing system according to the invention.

FIG. 1 shows a schematic illustration of the printing system 10 according to the invention. This has a data server 20 on the one hand and a printing apparatus 30 on the other hand which can be connected to each other via a data connection 22, via which the data server 20 can transmit to the printing apparatus 30 print data in particular in a form readable by the printing apparatus 30. The data server 20 is designed with a first raster image processor module 21 which converts print orders received by the data server into a file format readable by a printer, in particular a digital printer. The data server 20 can be designed as a classical server unit, computer or also as a mobile apparatus, such as a mobile phone or a tablet. The print orders to be received can be transmitted to the data server from an external source 40. Basically, it is also conceivable that the input of a print order is made directly on the data server 20 by a user, for instance by means of a keyboard, a mouse, an external data storage medium, such as a USB-memory or the like, in which case the transmission of the print order to the data server can be realized by entering the print order on the data server.

The received print data are converted by a raster image processor module 21 into a file format readable by the printing device 30 and can be transmitted via the data connection 22 to the printing device. The data connection 22 can be of direct nature, e.g. a network connection or a communication via a serial connection. In addition, the data connection 22 can be of indirect nature, e.g. via the internet or via interposed devices and intermediate servers that can be designed to assign the print order to a specific printing apparatus 30. Basically, the printing system 10 can be designed with a plurality of printing devices 30, in which case the data server can have a uniform raster image processor module 21. Due to the printing-device-specific conversion or rendering of the print data it may be necessary that the image data converted by the raster image processor module 21 require further adaptation for the printing apparatus 30 to ensure a printed image of the highest possible quality. For this, the devices provided in an indirect data connection 22, such as an intermediate server, can be designed to make a preselection and pass the converted image data to a suitable printing apparatus 30. In addition, the at least one printing apparatus 30 is designed with a second raster image processor module 31, by means of which the converted, transmitted image data can be adapted in a printer-specific manner prior to the processing of a printed image, i.e. prior to a printing of a surface. In this connection, an adaptation of the contrast, the brightness, the image sharpness, the rasterization, the resolution, the dimensioning of the image to be printed, a trapping, a color separation and/or an open-prepress-interface image setting of the transmitted image data can be effected in particular. Basically, the second raster image processor module 31 can be designed to independently carry out adaptations of the transmitted, converted image data. Alternatively or additionally, a device 32 having input means can be provided which enable a user to subsequently make adaptations of the transmitted, converted image data. By preference, the printing device is in this case designed with reproduction means 33 that can provide a numerical or graphical display of the transmitted and/or of the adapted printed image to be expected.

By preference, the implemented alterations of a printed image to be expected are reproduced in real time on the reproduction means 33 so that the user is able to realize an especially precise adaptation of the printed image. By preference, a juxtaposed before-after display of the transmitted image data and the adapted image data can be made, whereby the implemented adaptations can be displayed to a user in a particularly vivid manner.

Through the commands entered via the device 32 for the adaptation of the transmitted printed image the converted image data can, in particular after a corresponding processing by a respective processor, by the second raster image processor module, be edited or rendered into a form adapted to the printing device 30.

Basically, the printing system 10 is designed to print the image data converted by the raster image processor module 21 directly by means of the printing apparatus 30 if the converted image data have been converted/rendered to match the printing apparatus.

The invention claimed is:

1. A printing system for producing a digital printed image, in particular on a textile, having
    a data server which is designed to receive image data of a print order via a network, the internet, from an external storage medium or in the form of a print order directly produced on the data server,
    at least one printing apparatus with at least one digital print head, in particular an inkjet print head, which is designed to receive and print at least one print file for a print order, and
    a first raster image processor which is provided on the data server and designed to make available the received image data of the print order as a converted file format that can be read and processed in the form of a printed image by the printing apparatus, wherein the image data in the converted file format can be transmitted to the printing apparatus,
    wherein the at least one printing apparatus in each case has a second raster image processor which is adapted to the respective printing apparatus and designed in each case to adapt the image data in the converted file format in a printer-specific manner prior to the printing of a corresponding printed image.

2. The printing system according to claim 1,
    wherein the printing apparatus has reproduction means which are designed to display graphically and/or numerically the transmitted image data in the converted file format as a preliminary printed image to be expected.

3. The printing system according to claim 1,
    wherein the printing apparatus has input means for a user and processing means, by means of which at least one command can be entered and transmitted to the second raster image processor for the printer-specific adaptation of the transmitted image data.

4. The printing system according to claim 2, wherein prior to the execution of the at least one command for the printer-specific adaptation of the transmitted image data the reproduction means are designed to display the printed image to be expected after the adaptation.

5. The printing system according to claim 3, wherein based on the transmitted commands the second raster image processor is designed to adapt a contrast, a brightness, an image sharpness, a rasterization, a resolution, a dimensioning of the printed image to be printed, a trapping, a color separation and/or an open-prepress-interface image setting of the transmitted image data.

6. The printing system according to claim 1, wherein the printing apparatus is designed to print the image data adapted by the second raster image processor.

7. The printing system according to claim 1, wherein prior to the adaptation of the transmitted image data the second raster image processor is designed to convert these into an adaptable file format.

8. A method for producing a digital printed image, in particular on a textile, in which
image data for a print order are sent to a data server via a network, the internet, from an external storage medium or in the form of a print order directly produced on the data server,
by means of a first raster image processor the sent image data are converted into a data format which can be read and processed in the form of a printed image by at least one printing apparatus having at least one digital print head, in particular an inkjet print head, and in which the image data in the converted file format are transmitted to the printing apparatus,
wherein by means of a second raster image processor, which is adapted to the respective printing apparatus, the converted image data transmitted to the printing apparatus are adapted in a printer-specific manner on the printing apparatus prior to the printing of a corresponding printed image.

9. The method according to claim 8, wherein on the printing apparatus reproduction means are provided, by means of which the transmitted image data in the converted file format are displayed graphically and/or numerically as a preliminary printed image to be expected.

10. The method according to claim 8, wherein at least one command to the second raster image processor for the printer-specific adaptation of the transmitted image data is entered via input means for a user and transmitted via processing means.

11. The method according to claim 10, wherein prior to the execution of the commands for the printer-specific adaptation of the transmitted image data the printed image to be expected after the adaptation is displayed by means of the reproduction means.

12. The method according to claim 10, wherein based on the transmitted commands a contrast, a brightness, an image sharpness, a rasterization, a resolution, a dimensioning of the printed image to be printed, a trapping, a color separation and/or an open-prepress-interface image setting of the transmitted image data is adapted by the second raster image processor.

13. The method according to claim 8, wherein the adapted image data are transformed by the at least one print head of the printing apparatus into a printed image.

14. The method according to claim 8, wherein prior to the adaptation of the transmitted image data these are converted on the printing apparatus, preferably by the second raster image processor, into an adaptable file format.

* * * * *